(12) United States Patent
Hansen et al.

(10) Patent No.: US 10,534,678 B2
(45) Date of Patent: Jan. 14, 2020

(54) DATA STORAGE BACKUP MANAGEMENT METHOD

(71) Applicant: Brilliant Points, Inc., Reno, NV (US)

(72) Inventors: Christopher G. Hansen, Lehi, UT (US); Karl Christopher Hansen, Lehi, UT (US)

(73) Assignee: Brilliant Points, Inc., Reno, NV (US)

( * ) Notice: Subject to any disclaimer, the term of this patent is extended or adjusted under 35 U.S.C. 154(b) by 125 days.

(21) Appl. No.: 15/612,859

(22) Filed: Jun. 2, 2017

(65) Prior Publication Data

US 2018/0157431 A1 Jun. 7, 2018

Related U.S. Application Data

(60) Provisional application No. 62/317,630, filed on Apr. 4, 2016.

(51) Int. Cl.
*G06F 11/00* (2006.01)
*G06F 11/20* (2006.01)
*G06F 16/23* (2019.01)

(52) U.S. Cl.
CPC ...... *G06F 11/2094* (2013.01); *G06F 16/2365* (2019.01)

(58) Field of Classification Search
CPC ............ G06F 11/1469; G06F 11/2094; G06F 17/30371
See application file for complete search history.

(56) References Cited

U.S. PATENT DOCUMENTS

| 6,289,415 | B1 * | 9/2001 | Johnson | G06F 11/1076 711/111 |
| 2003/0056142 | A1 * | 3/2003 | Hashemi | G06F 11/1084 714/6.21 |
| 2009/0240783 | A1 * | 9/2009 | Susairaj | H04L 67/1097 709/217 |
| 2011/0202792 | A1 * | 8/2011 | Atzmony | G06F 11/1076 714/6.24 |

OTHER PUBLICATIONS

Mell et al., "The NIST Definition of Cloud Computing", NIST Special Publication 800-145, Sep. 2011 (Year: 2011).*
Amazon Web Services, "AWS Storage Gateway", retrieved using Wayback Machine: https://web.archive.org/web/20130326032338/https://aws.amazon.com/storagegateway/, 2013 (Year: 2013).*
D. Petcu, "Consuming resources and services from multiple clouds," J. Grid Comput., vol. 12, No. 2, pp. 321-345, Jun. 2014. [Online]. Available: http://dx.doi.org/10.1007/s10723-013-9290-3.

(Continued)

*Primary Examiner* — Michael Maskulinski
(74) *Attorney, Agent, or Firm* — Maschoff Brennan; Paul G. Johnson

(57) ABSTRACT

A computer-implemented method to store data may include writing data to at least one of a database or one or more local storage devices. The method may also include generating redundancy information for the data. The method may also include writing the redundancy information to at least one of a remote storage device or a removable storage device.

12 Claims, 3 Drawing Sheets

(56) References Cited

OTHER PUBLICATIONS

D. A. Patterson, G. Gibson, and R. H. Katz, A case for redundant arrays of inexpensive disks (RAID). ACM, 1988, vol. 17, No. 3. vii, 4, 41, 42, pp. 109-116.
A. Bessani, M. Correia, B. Quaresma, F. Andr'e, and P. Sousa, "DepSky: Dependable and secure storage in a cloud-of-clouds," in Proceedings of the Sixth Conference on Computer Systems, ser. EuroSys '11. New York, NY, USA: ACM, 2011, pp. 31-46. [Online]. Available: http://doi.acm.org/10.1145/1966445.1966449. Accessed: Jun. 13, 2017.
H. Takabi, J. B. D. Joshi, and G. J. Ahn, "Security and privacy challenges in cloud computing environments," IEEE Security Privacy, vol. 8, No. 6, pp. 24-31, Nov. 2010.
C.Wang, Q.Wang, K. Ren, and W. Lou, "Ensuring data storage security in cloud computing," in Quality of Service, 2009. IWQoS. 17th International Workshop on, Jul. 2009, pp. 1-9.
M. A. Alzain, B. Soh, and E. Pardede, "MCDB: Using multi-clouds to ensure security in cloud computing," in Dependable, Autonomic and Secure Computing (DASC), 2011 IEEE Ninth International Conference on, Dec. 2011, pp. 784-791.
H. Abu-Libdeh, L. Princehouse, and H. Weatherspoon, "RACS: A case for cloud storage diversity," in Proceedings of the 1st ACM Symposium on Cloud Computing, ser. SoCC '10. New York, NY, USA: ACM, 2010, pp. 229-240. [Online]. Available: http://doi.acm.org/10.1145/1807128.1807165.
M. Schnjakin, D. Korsch, M. Schoenberg, and C. Meinel, "Implementation of a secure and reliable storage above the untrusted clouds," in Computer Science Education (ICCSE), 2013 8th International Conference on, Apr. 2013, pp. 347-353.
M. D. Francesco, N. Li, M. Raj, and S. K. Das, "A storage infrastructure for heterogeneous and multimedia data in the Internet of Things," in Green Computing and Communications (GreenCom), 2012 IEEE International Conference on, Nov. 2012, pp. 26-33.
M. A. Hail, M. Amadeo, A. Molinaro, and S. Fischer, "Caching in named data networking for the wireless Internet of Things," in Recent Advances in Internet of Things (RIoT), 2015 International Conference on, Apr. 2015, pp. 1-6.
M. Fazio, A. Celesti, M. Villari, and A. Puliafito, "The need of a hybrid storage approach for IoT in PaaS cloud federation," in Advanced Information Networking and Applications Workshops (WAINA), 2014 28th International Conference on, May 2014, pp. 779-784.
C. Cecchinel, M. Jimenez, S. Mosser, and M. Riveill, "An architecture to support the collection of big data in the Internet of Things," in Services (Services), 2014 IEEE World Congress on, Jun. 2014, pp. 442-449.
H. Graupner, K. Torkura, P. Berger, C. Meinel, and M. Schnjakin, "Secure access control for multi-cloud resources," in Local Computer Networks Conference Workshops (LCN Workshops), 2015 IEEE 40th, Oct. 2015, pp. 722-729.
Y. Chi, W. Cai, Z. Hong, H. C. B. Chan, and V. C. M. Leung, "A privacy and price-aware intercloud system," in 2015 IEEE 7th International Conference on Cloud Computing Technology and Science (CloudCom), Nov. 2015, pp. 298-305.
C. W. Ling and A. Datta, "InterCloud RAIDer: A do-it-yourself multi-cloud private data backup system," in Proceedings of the 15th International Conference on Distributed Computing and Networking—vol. 8314, ser. ICDCN 2014. New York, NY, USA: Springer-Verlag New York, Inc., 2014, pp. 453-468. [Online]. Available: http://dx.doi.org/10.1007/978-3-642-45249-9.
K. D. Bowers, A. Juels, and A. Oprea, "HAIL: A high-availability and integrity layer for cloud storage," in Proceedings of the 16th ACM Conference on Computer and Communications Security, ser. CCS '09. New York, NY, USA: ACM, 2009, pp. 187-198. [Online]. Available: http://doi.acm.org/10.1145/1653662.1653686.
G. Chockler, R. Guerraoui, I. Keidar, and M. Vukolic, "Reliable distributed storage," Computer, vol. 42, No. 4, pp. 60-67, Apr. 2009.
Q. Zhang, S. Li, Z. Li, Y. Xing, Z. Yang, and Y. Dai, "CHARM: A cost-efficient multi-cloud data hosting scheme with high availability," IEEE Transactions on Cloud Computing, vol. 3, No. 3, pp. 372-386, Jul. 2015.
M. Schnjakin, T. Metzke, and C. Meinel, "Applying erasure codes for fault tolerance in cloud-RAID," in Computational Science and Engineering (CSE), 2013 IEEE 16th International Conference on, Dec. 2013, pp. 66-75.
M. Vrable, S. Savage, and G. M. Voelker, "BlueSky: A cloud-backed file system for the enterprise," in Proceedings of the 10th USENIX Conference on File and Storage Technologies, ser. FAST'12. Berkeley, CA, USA: USENIX Association, 2012, pp. 19-19. [Online]. Available: http://dl.acm.org/citation.cfm?id=2208461.2208480.
C. Selvakumar, G. J. Rathanam, and M. R. Sumalatha, "PDDS—improving cloud data storage security using data partitioning technique," in Advance Computing Conference (IACC), 2013 IEEE 3rd International, Feb. 2013, pp. 7-11.
M. Schnjakin and C. Meinel, "Evaluation of cloud-RAID: A secure and reliable storage above the clouds," in Computer Communications and Networks (ICCCN), 2013 22nd International Conference on, Jul. 2013, pp. 1-9.
M. Schnjakin and C. Meinel, "Scrutinizing the state of cloud storage with cloud-RAID: A secure and reliable storage above the clouds," in Cloud Computing (Cloud), 2013 IEEE Sixth International Conference on, Jun. 2013, pp. 309-318.
G. Song, S. Kim, and D. Seo, "Saveme: client-side aggregation of cloud storage," IEEE Transactions on Consumer Electronics, vol. 61, No. 3, pp. 302-310, Aug. 2015.
B. Mao, S. Wu, and H. Jiang, "Exploiting workload characteristics and service diversity to improve the availability of cloud storage systems," IEEE Transactions on Parallel and Distributed Systems, vol. PP, No. 99, pp. 1-1, 2015.
G. Ateniese, R. Di Pietro, L. V. Mancini, and G. Tsudik, "Scalable and efficient provable data possession," in Proceedings of the 4th International Conference on Security and Privacy in Communication Networks, ser. SecureComm '08. New York, NY, USA: ACM, 2008, pp. 9:1-9:10. [Online]. Available: http://doi.acm.org/10.1145/1460877.1460889.
C. W. Chang, P. Liu, and J. J. Wu, "Probability-based cloud storage providers selection algorithms with maximum availability," in Parallel Processing (ICPP), 2012 41st International Conference on, Sep. 2012, pp. 199-208.
"Standard RAID levels," https://en.wikipedia.org/wiki/Standard_RAID_levels, accessed: Jun. 9, 2017.
"What is RAID 0," http://blog.open-e.com/what-is-raid-0/, accessed: Mar. 21, 2016.
"Cisco UCS servers RAID guide, chapter 1: RAID overview," http://www.cisco.com/c/en/us/td/docs/unified_computing/ucs/c/sw/raid/configuration/guide/RAID_GUIDE/IntroToRAID.pdf#page=14, accessed: Jun. 13, 2017.
"What are RAID 1, RAID 1+0 and RAID 0+1," http://blog.open-e.com/what-are-raid-1-raid-10-and-raid-01/, accessed: Jun. 13, 2017.
"RAID 2, RAID 3, RAID 4 what it is, how it works? the history lesson," http://blog.open-e.com/raid-2-raid-3-raid-4-what-it-is-how-it-works-the-history-lesson/, accessed: Jun. 13, 2017.
"RAID 5? RAID 6? or other alternativee?" http://blog.open-e.com/raid-5-raid-6-or-other-alternativee/, accessed: Jun. 13, 2017.
Anvin, H. Peter, "The mathematics of RAID-6," https://www.kernel.org/pub/linux/kernel/people/hpa/raid6.pdf, Dec. 20, 2011.
"Nested RAID levels," https://en.wikipedia.org/wiki/Nested RAID levels, Feb. 25, 2017.
"What is the hadoop distributed file system (HDFS)?" http://www-01.ibm.com/software/data/infosphere/hadoop/hdfs/, accessed: Jun. 13, 2017.
"Welcome to apache hadoop!" http://hadoop.apache.org/, accessed: Jun. 13, 2017.
"BeeGFS," http://www.beegfs.com/content/documentation/, Jun. 1, 2017.
"About moosefs," https://moosefs.com/products.html, accessed: Jun. 13, 2017.
Prickett Morgan, Timothy, "Red hat snatches storage gluster file system for $136m," hhttps://www.theregister.co.uk/2011/10/04/redhat_buys_gluster/, Oct. 4, 2011.
"Zfs," https://en.wikipedia.org/wiki/ZFS, accessed: May 22, 2017.
"Zfs," http://www.freenas.org/zfs/, accessed: Jun. 13, 2017.

(56) References Cited

OTHER PUBLICATIONS

"A history of storage cost (update)." http://www.mkomo.com/cost-per-gigabyte-update. Mar. 9, 2014.
"Mdadm," http://neil.brown.name/blog/mdadm, Jun. 7, 2004.
"Linux raid," https://raid.wiki.kernel.org/index.php/Linux Raid, Jun. 9, 2017.
D. Colarelli, D. Grunwald, and M. Neufeld, "The case for massive arrays of idle disks (maid)," in The 2002 Conference on File and Storage Technologies, 2002.
Lowe, Scott, "Non-standard raid levels primer: Raid 1e," http://www.techrepublic.com/article/non-standard-raid-levels-primer-raid-1e/, May 4, 2007.
"Zfs and raid-z recoverability and performance," quetek.com/zfsandraidz.htm, Apr. 24, 2015.
Garrison, Justin, "9 alternatives for windows home servers drive extender," http://www.howtogeek.com/howto/36458/9-alternatives-for-windows-home-servers-drive-extender/, Nov. 29, 2010.
"Drive bender public release arriving this week," http://www.wegotserved.com/2011/10/10/drive-bender-public-release-arriving-week/, Oct. 10, 2011.
"Stablebit drivepool 2 year review," http://www.homemediatech.net/stablebit-drivepool-2-year-review/83, Dec. 1, 2013.
"Intel rapid storage technology," http://www.intel.com/content/www/us/en/architecture-and-technology/rapid-storage-technology.html, accessed: Jun. 13, 2017.
"IBM spectrum scale," http://www-03.ibm.com/systems/storage/spectrum/scale/, accessed: Jun. 13, 2017.
"Network-attached storage," https://lime-technology.com/network-attached-storage/, 2016.
"Beyondraid," http://www.drobo.com/drobo/beyondraid/, accessed: Jun. 13, 2017.
Charles M. Kozierok, "RAID level 7," http://www.pcguide.com/ref/hdd/perf/raid/levels/singleLevel7-c.html, Apr. 17, 2001.
C. Hansen and J. Archibald, "The case for raid 4: Cloud-raid integration with local storage," in 2016 International Conference on Availability, Reliability and Security, IEEE International, 2016. pp. 235-240.
C. Herley, D. Florencio, and P. van Oorschot, "An administrators guide to internet password research," Nov. 2014. [Online]. Available: https://www.microsoft.com/en-us/research/publication/an-administrators-guide-to-internet-password-research/, Proceedings of USENIX LISA '14, pp. 1-18.
G. Tajadod, L. Batten, and K. Govinda, "Microsoft and Amazon: A comparison of approaches to cloud security," in Cloud Computing Technology and Science (CloudCom), 2012 IEEE 4th International Conference on, Dec. 2012, pp. 539-544.
"Introducing geo-replication for Windows Azure storage," https://blogs.msdn.microsoft.com/windowsazurestorage/2011/09/15/introducing-geo-replication-for-windows-azure-storage/, Sep. 15, 2011.
"Amazon SimpleDB FAQs," http://aws.amazon.com/simpledb/faqs/, accessed: Jun. 13, 2017.
"Amazon EC2 Service Level Agreement," http://aws.amazon.com/ec2/sla/, accessed: Jun. 13, 2017.
"Service level agreements," https://azure.microsoft.com/en-us/support/legal/sla/, accessed: Jun. 13, 2017.
J. Araujo, P. Maciel, M. Torquato, G. Callou, and E. Andrade, "Availability evaluation of digital library cloud services," in Dependable Systems and Networks (DSN), 2014 44th Annual IEEE/IFIP International Conference on, Jun. 2014, pp. 666-671.
"Summary of the Amazon EC2 and Amazon RDS service disruption in the US east region," http://aws.amazon.com/message/65648/, accessed: Jun. 13, 2017.
Blodget, Henry, "Amazon's cloud crash disaster permanently destroyed many customers' data," http://www.businessinsider.com/amazon-lost-data-2011-4, Apr. 28, 2011.
S. Gregori, A. Cabrini, O. Khouri, and G. Torelli, "On-chip error correcting techniques for new-generation flash memories," Proceedings of the IEEE, vol. 91, No. 4, pp. 602-616, Apr. 2003.
H. Kaneko, T. Matsuzaka, and E. Fujiwara, "Three-level error control coding for dependable solid-state drives," in Dependable Computing, 2008. PRDC '08. 14th IEEE Pacific Rim International Symposium on, Dec. 2008, pp. 281-288.
R. Bez, E. Camerlenghi, A. Modelli, and A. Visconti, "Introduction to flash memory," Proceedings of the IEEE, vol. 91, No. 4, pp. 489-502, Apr. 2003.
"Hardware raid vs. software raid: Which implementation is best for my application?" http://www.adaptec.com/nr/rdonlyres/14b2fd84-f7a0-4ac5-a07a-214123ea3dd6/0/4423 sw hwraid 10.pdf, 2006.
"Search the largest api directory on the web," http://www.programmableweb.com/category/storage/apis?category=20171, accessed: Jun. 13, 2017.
"Other http/ftp client libraries," https://curl.haxx.se/libcurl/competitors.html, accessed: Jun. 13, 2017.
"RAID failures." http://www.raid-failure.com/Default.aspx, accessed: Jun. 13, 2017.
"RAID reliability calculator—simple MTTDL model—servethehome." http://www.servethehome.com/raid-calculator/raid-reliability-calculator-simple-mttdl-model/, accessed: Jun. 13, 2017.
"RAID reliability calculator." http://wintelguy.com/raidmttdl.pl, accessed: Jun. 13, 2017.
M.L. Shooman, Reliability of Computer Systems and Networks: Fault Tolerance, Analysis and Design. New York, USA: Wiley-Interscience, 2002, pp. 112-114,438-441.
M. Schnjakin, R. Alnemr, and C. Meinel, Web Information Systems Engineering—WISE 2010 Workshops: WISE 2010 International Symposium WISS, and International Workshops CISE, MBC, Hong Kong, China, Dec. 12-14, 2010, Revised Selected Papers. Berlin, Heidelberg: Springer Berlin Heidelberg, 2011, ch. A Security and High-Availability Layer for Cloud Storage, pp. 449-462. [Online]. Available: http://dx.doi.org/10.1007/978-3-642-24396-7.
B. Mao, S. Wu, and H. Jiang, "Improving storage availability in cloud-of-clouds with hybrid redundant data distribution," in Parallel and Distributed Processing Symposium (IPDPS), 2015 IEEE International, May 2015, pp. 633-642.
Miller, Scott Alan, "Understanding and using RAID 100," available online at https://blog.storagecraft.com/using-raid-100/, Sep. 10, 2014, 4 pgs.
Miller, Scott Alan, "Understanding RAID performance at various levels," available online at https://blog.storagecraft.com/raid-performance/, Jan. 5, 2015, 10 pgs.
Contributors page from the btrfs Wiki, [online] https://btrfs.wiki.kernel.org/index.php/Contributors, Mar. 24, 2017.
Main page page from the btrfs Wiki, [online] https://btrfs.wiki.kernel.org/index.php/Main Page, May 18, 2017.
Seltzer, Larry, "Cloud storage price check." http://www.zdnet.com/article/cloud-storage-price-check/ Jun. 24, 2014, 15 pgs.

* cited by examiner

DATA STORAGE BACKUP MANAGEMENT METHOD

CROSS-REFERENCE TO RELATED APPLICATION

This application claims the benefit of and priority to U.S. Provisional App. No. 62/317,630, filed Apr. 4, 2016, which is incorporated herein by reference in its entirety.

FIELD

The embodiments discussed herein are related to data storage management methods.

BACKGROUND

Data storage and backup may generally be done in a few different ways. For example, local data storage and backup may be performed by mirroring a physical data storage device onto another physical data storage device. Alternatively, cloud-based data storage and backup may be performed by mirroring a physical data storage device onto a cloud-based data storage device. In addition, performance improvements for data storage devices may be achieved through the use of multiple physical data storage devices in a redundant array of independent disks (RAID) configuration. Different RAID levels may be configured with differing levels of redundancy and performance, from no redundancy in a RAID-0 configuration to mirroring in a RAID-1 configuration.

The subject matter claimed herein is not limited to embodiments that solve any disadvantages or that operate only in environments such as those described above. Rather, this background is only provided to illustrate one example technology area where some embodiments described herein may be practiced.

SUMMARY

In an example embodiment, a computer-implemented method to store data may include writing data to at least one of a database or one or more local storage devices. The method may also include generating redundancy information for the data. The method may also include writing the redundancy information to a remote storage device or a removable storage device.

In another example embodiment, a computer-implemented method to store data may include configuring a first physical storage device and a second physical storage device in a RAID-0 array. The method may also include writing data to the RAID-0 array. The method may also include generating redundancy information for the data written to the RAID-0 array. The method may also include asynchronously writing the redundancy information to a third storage device, the third storage device communicatively coupled with the RAID-0 array by a network.

In another example embodiment, a system to store data may include a local storage device and a controller. The controller may be communicatively coupled to the local storage device. The controller may be configured to write data to at least one of a database or the local data storage device. The controller may also be configured to generate redundancy information for the data. The controller may also be configured to write the redundancy information to at least one of a remote storage device or a removable storage device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some systems and methods disclosed here are directed to data storage and backup. Within the context of data storage and backup, different methods may be employed. Data may be stored in a local data storage device and mirrored into other local or cloud-based data storage devices. Alternatively, data may be striped across multiple local physical data storage devices. In addition, data may be striped across multiple cloud-based data storage devices. In addition, data may be striped across multiple local physical storage devices and redundancy information may be stored on multiple local physical storage devices to help prevent the loss of data in the event of failure of a physical data storage device. In contrast, one or more techniques described herein may include the striping of data across multiple local physical data storage devices together with the storage of redundancy information for the multiple local physical data storage devices on cloud-based data storage devices.

Figure 1:
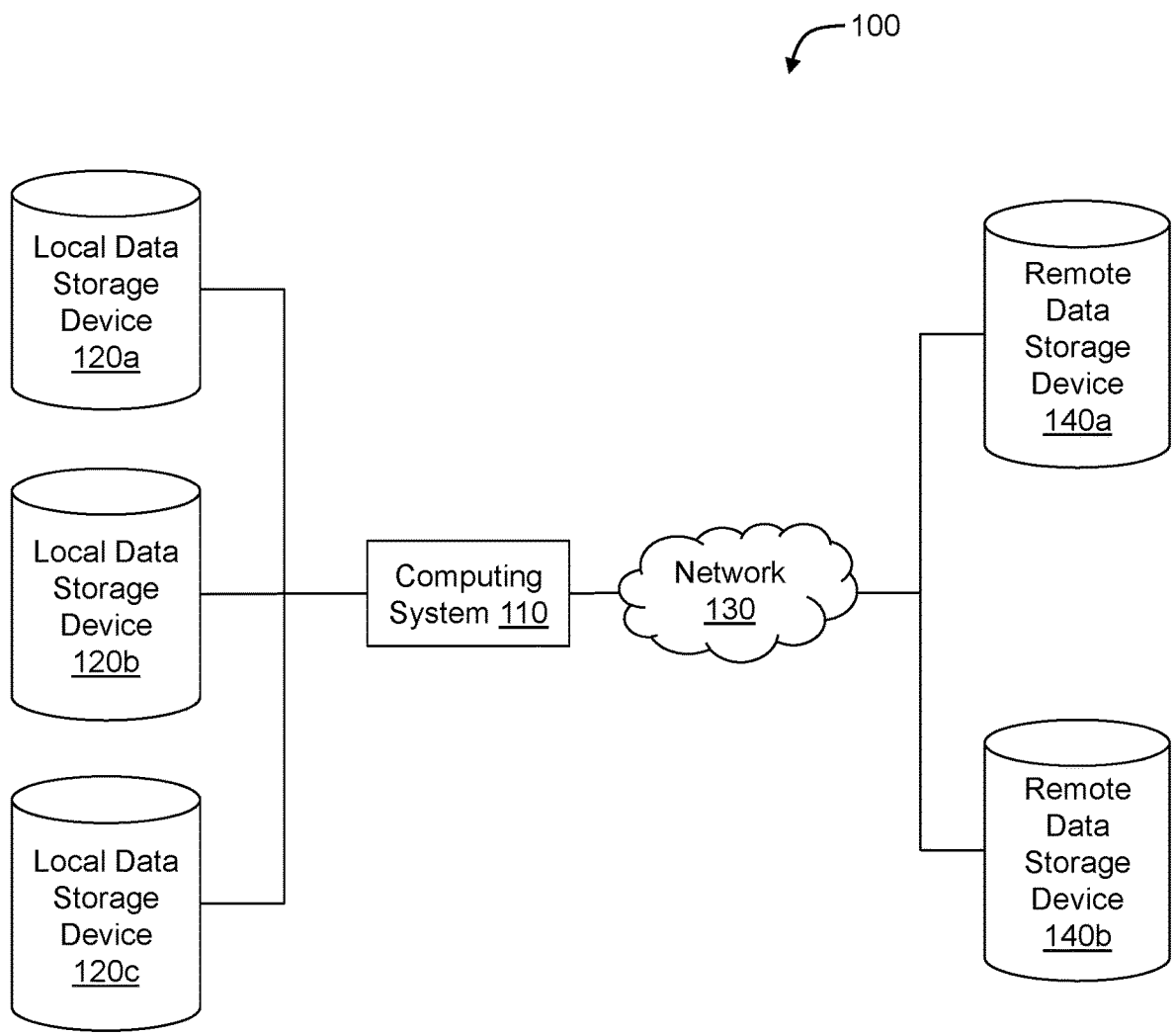
FIG. 1 illustrates an example system configured for data storage and backup.

FIG. 1 illustrates an example system 100 configured to store and backup data, arranged in accordance with at least one embodiment described herein. The system may include a computing system 110, a first local data storage device 120a, a second local data storage device 120b, a third local data storage device 120c, a network 130, a first remote data storage device 140a, and a second remote data storage device 140b.

The first, second, and third local data storage devices 120a, 120b, 120c may be collectively or generically referred to as local data storage devices 120 or local data storage device 120. Although three local data storage devices 120 are depicted, the system 100 may include one, two, or any number of local data storage devices 120.

The first and second remote data storage devices 140a, 140b may be collectively or generically referred to as remote data storage devices 140 or remote data storage device 140. Although two remote data storage devices 140 are depicted, the system 100 may include one remote data storage device or multiple remote data storage devices 140. Alternatively or additionally, the system 100 may include one or more removable data storage devices, which may be used in a similar manner as the remote data storage devices 140 instead of or in addition to one or more of the remote data storage devices 140.

In some embodiments, the computing system 110 may include a processor, a data storage device controller, a network controller, volatile memory, a display, peripheral devices, a RAID controller, and/or other devices. For example, in some embodiments, the computing system 110 may be a personal desktop computer. Alternatively or additionally, in some embodiments, the computing system 110 may be a tablet computer, a cellular telephone, a smartphone, or any other electronic device. In some embodiments, the computing system 110 may include a RAID controller. The computing system 110 may be configured to direct the storage of data in the local data storage devices 120. The computing system 110 may be communicatively coupled with the remote data storage devices 140 the network 130.

In some embodiments, the computing system 110 may be configured to operate the local data storage devices 120 in a RAID array. For example, in a RAID-0 array, data may be striped across two or more of the local data storage devices 120. In other embodiments, the local data storages devices 120 may be arranged in some other RAID level.

In some embodiments, the computing system 110 may generate redundancy information for the data stored in the local data storage devices 120. In these and other embodiments, the computing system 110 may generate the redundancy information as data is written to the local data storage devices 120. For example, the computing system 110 may generate the redundancy information as data is striped across two or more of the local data storage devices 120.

Alternatively or additionally the redundancy information may be generated asynchronously with striping or writing the data to the local data storage devices 120. Asynchronous generation of the redundancy information may improve write performance by eliminating redundancy information generation as a bottleneck as may occur with, e.g., RAID-4. In some embodiments, the asynchronous generation of the redundancy information may occur when the computing system 110, and more particularly, when a central processing unit (CPU) of the computing system 110, is idle.

In some embodiments, the computing system 110 may generate parity bits, error-correcting codes (ECC), erasure codes, or other redundancy information. For example, in some embodiments, the computing system 110 may generate odd parity calculations for the data stored in the local data storage devices 120. Alternatively or additionally, in some embodiments, the computing system 110 may generate even parity calculations for the data stored in the local data storage devices 120. In some embodiments, the computing system 110 may generate multiple levels of redundancy information.

In some embodiments, the local data storage devices 120 may include one or more physical data storage devices. For example, in some embodiments, the local data storage devices 120 may include a data storage device communicatively coupled with the computing system 110. The local data storage devices 120 may include hard disk drives, fixed solid-state drives, fixed flash drives, or other fixed data storage systems. In some embodiments, the local data storage devices 120 may be communicatively coupled with the computing system 110 by a parallel AT attachment (PATA) interface, a serial AT attachment (SATA) interface, a universal serial bus (USB) interface, an Institute of Electrical and Electronics Engineers (IEEE) 1394 interface, or other interfaces.

In some embodiments, the network 130 may be configured to communicatively couple the computing system 110 with the remote storage device 140a. In some embodiments, the network 130 may include any network or configuration of networks configured to send and receive communications between systems and devices. In some embodiments, the network 130 may include a wired network or wireless network, and may have numerous different configurations. In some embodiments, the network 130 may also be coupled to or may include portions of the Internet. For example, in some embodiments, the network 130 may be a local area network inside a single home. For example, the network 130 may include a router with which the computing system 110 and the remote data storage device 140a may be communicatively coupled. Alternatively or additionally, in some embodiments, the network 130 may include a local area network and a wide area network such as the Internet.

In some embodiments, the remote data storage devices 140 may include a physical data storage device. For example, the remote data storage devices 140 may include a data storage device communicatively coupled with the network 130 as a Network-Attached-Storage (NAS) in a home network. Alternatively or additionally, in some embodiments, the remote data storage devices 140 may include a data storage device communicatively coupled with the network 130 by a second computing system. In some embodiments, the remote data storage devices 140 may include a cloud-based data storage device. For example, in some embodiments, the first remote data storage device 140a may include cloud-based data storage operated by a first entity and the second remote data storage device 140b may include cloud-based data storage operated by a second entity different from the first.

In some embodiments, the computing system 110 may be configured to provide the redundancy information to the first remote data storage device 140a and/or the second remote data storage device 140b. For example, the computing system 110 may provide the redundancy information to the first remote data storage device 140a and may not provide the redundancy information to the second remote data storage device 140b. Alternatively or additionally, in some embodiments, a user of the local data storage devices 120 may select to store the redundancy information on both the first remote data storage device 140a and the second remote data storage device 140b. In these and other embodiments, the first remote data storage device 140a may be associated with a first cloud storage service and the second remote data storage device 140b may be associated with a second cloud storage service. In these and other embodiments, the first remote data storage device 140a may store a first fraction of the redundancy information and the second remote data storage device 140b may store a second fraction of the redundancy information. In some embodiments, the user of the local data storage devices 120 may select the first fraction and the second fraction. Alternatively, the same redundancy information may be stored on both remote data storage devices 140.

In some embodiments, the computing system 110 may detect a changed condition in the first remote data storage device 140a or the second remote data storage device 140b. For example, the first remote data storage device 140a may have insufficient available storage capacity to store additional redundancy information. In response to detecting that the first remote data storage device 140a has insufficient available storage capacity, the computing system 110 may provide the redundancy information to the second remote data storage device 140b and may not provide the redundancy information to the first remote data storage device 140a. Alternatively or additionally, in some embodiments, the computing system 110 may detect that a third remote data storage device, e.g., associated with a third cloud storage service, is available to receive redundancy information. In these and other embodiments, the computing system 110 may provide a third fraction of the redundancy information to the third cloud storage device.

In some embodiments, the computing system 110 may be configured to generate two or more levels of redundancy. In these and other embodiments, a first level of redundancy information may include parity bits calculated from an XOR operation of the data written to the local data storage devices 120 and a second level of redundancy information may include erasure codes. The erasure codes may be calculated using Galois fields together with an XOR of the data written to the local data storage devices 120. Alternatively or additionally, the calculation of the two or more levels of redundancy information may be consistent with how RAID-6, which uses two redundancy layers, operates.

In some embodiments, the computing system 110 may be configured to detect a failure or an unavailability of one of the local data storage devices 120 or one of the remote data storage devices 140. For example, the first local data storage device 120*a* may experience a failure. In response to detecting the failure of the first local data storage device 120*a*, the computing system 110 may obtain redundancy information from the remote data storage devices 140. In some embodiments, the computing system 110 may repair the failure of the first local data storage device 120*a* using the redundancy information obtained from the remote data storage devices 140. Alternatively or additionally, in some embodiments, the first remote data storage device 140*a* may be unavailable. For example, a company operating the first remote data storage device 140*a* may be experiencing an outage or other problem. In response to detecting the unavailability of the first remote data storage device 140*a*, the computing system 110 may be configured to regenerate the redundancy information stored in the first remote data storage device 140*a* from the data stored in the local data storage devices 120. The computing system 110 may provide the regenerated redundancy information to the second remote data storage device 140, a third remote data storage device, or elsewhere.

Modifications, additions, or omissions may be made to the system 100 without departing from the scope of the present disclosure. For example, in some embodiments, the system 100 may include a single local data storage device 120 and may include a single remote data storage device 140. In these and other embodiments, the computing system 110 may be configured to generate redundancy information for the data stored on the local data storage device 120 and may provide the redundancy information to the remote data storage device 140.

Alternatively or additionally, in some embodiments, the system 100 may not include the network 130. In these and other embodiments, the system 100 may include one or more removable data storage devices. The removable data storage devices may be storage devices similar to the local data storage devices 120 and the remote data storage devices 140, except that they may be removable, whereas the local data storage devices 120 may be fixed, e.g., with respect to the computing system 110. In some embodiments, the one or more removable data storage devices may include removable solid-state drives, removable flash drives, removable memory cards such as CompactFlash cards, Secure Digital cards, Memory Stick cards, xD-Picture cards, or other removable data storage devices. In these and other embodiments, the one or more removable data storage devices may be communicatively coupled by a removable connection such as a Universal Serial Bus (USB) connection, a wireless connection, a THUNDERBOLT-compatible connection or other hot swappable or hot-pluggable connections. In these and other embodiments, the computing system 110 may be configured to detect an availability of the removable data storage devices. The removable data storage devices may be available when the removable data storage devices have sufficient available storage capacity to store redundancy information and when the removable data storage devices are communicatively coupled with the computing system 110. The computing system 110 may provide the redundancy information to the removable data storage devices when the removable data storage devices are available.

Figure 2:
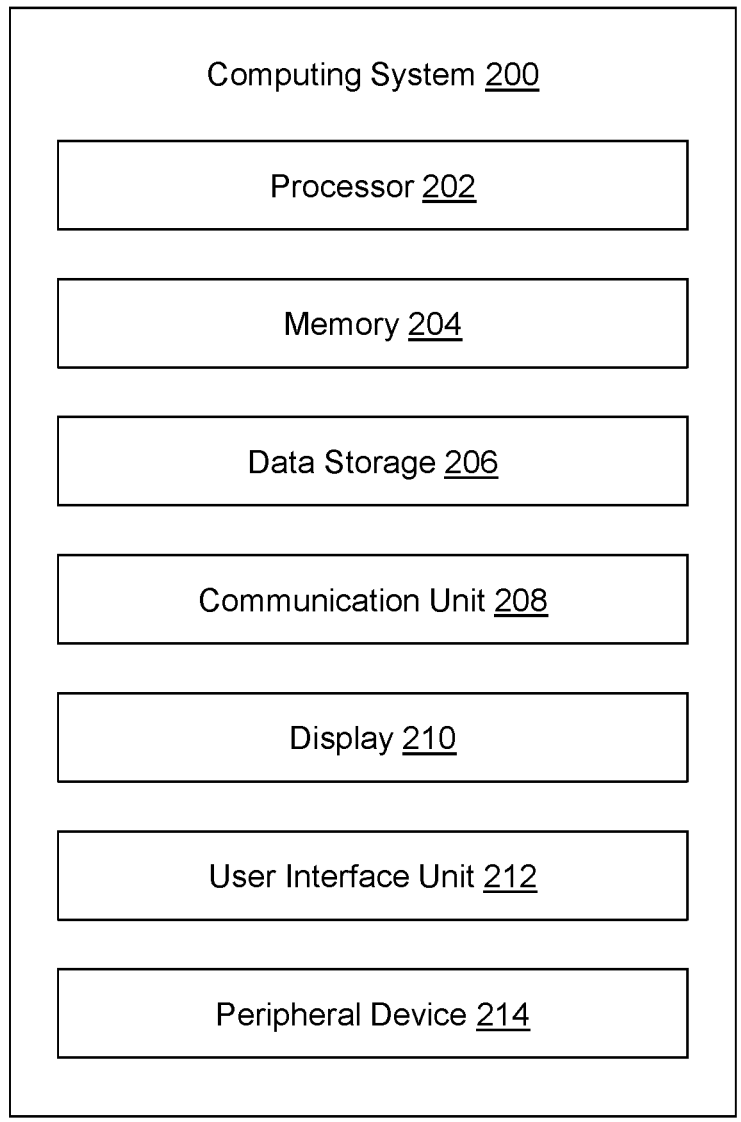
FIG. 2 illustrates an example computing system that may be used in data storage and backup.

FIG. 2 illustrates an example computing system 200 (hereinafter "system 200") that may be used to store data, arranged in accordance with at least one embodiment described in the present disclosure. In these and other embodiments, the system 200 may execute computer-readable instructions that include and/or relate to the local data storage devices 120, the computing system 110, the network 130, and/or the remote data storage devices 140 of FIG. 1.

As illustrated in FIG. 2, the system 200 may include a processor 202, a memory 204, a data storage 206, a communication unit 208, a display 210, a user interface unit 212, and a peripheral device 214, which all may be communicatively coupled. In some embodiments, the system 200 may be part of any of the systems or devices described in this disclosure. For example, the system 200 may be part of a data storage system such as the system 100 of FIG. 1 and/or may be part of the computing system 110 or the remote data storage devices 140. Alternatively or additionally, the system 200 may include and/or may be coupled to one or more of the devices of FIG. 1. For instance, the system 200 may include one or more of the local data storage devices 120 or the computing system 110 of FIG. 1 and/or may be communicatively coupled to the local data storage devices 120, and/or the remote data storage devices 140.

Generally, the processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. As mentioned elsewhere, each of the computing system 110, the local data storage devices 120, and the remote data storage devices 140 may include software and programming, which are examples of instructions that may be executed by the processor 202 to perform or control performance of one or more of the operations described herein.

Although illustrated as a single processor in FIG. 2, the processor 202 may more generally include any number of processors distributed across any number of networks or physical locations that are configured to perform individually or collectively any number of operations described herein. In some embodiments, the processor 202 may interpret and/or execute program instructions and/or process data stored in the memory 204, the data storage 206, or the memory 204 and the data storage 206. In some embodiments, the processor 202 may fetch program instructions from the data storage 206 and load the program instructions into the memory 204.

After the program instructions are loaded into the memory 204, the processor 202 may execute the program instructions. For example, the system 200 may be included in, may be communicatively coupled to, and/or may include one or more of the local data storage devices 120, the computing system 110, the remote data storage devices 140, or the network 130 of FIG. 1. In these and other embodiments, the instructions may include the processor 202 executing an algorithm to store data in the local data storage devices 120 and to generate redundancy information for data stored in the local data storage devices 120.

The memory 204 and the data storage 206 may include non-transitory computer-readable storage media for carrying or having computer-executable instructions or data structures stored thereon. Such computer-readable storage media may be any available non-transitory media that may be accessed by a general-purpose or special-purpose computer, such as the processor 202. By way of example, and not limitation, such non-transitory computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage media which may be used to carry or store desired program code in the form of computer-executable instructions or data structures and which may be accessed by a general-purpose or special-purpose computer. Combinations of the above may also be included within the scope of non-transitory computer-readable storage media. Computer-executable instructions may include, for example, instructions and data configured to cause the processor 202 to perform or control performance of a certain operation or group of operations, such as one or more blocks of a method 300 of FIG. 3 described below.

The communication unit 208 may include any component, device, system, or combination thereof that is configured to transmit or receive information over a network. In some embodiments, the communication unit 208 may communicate with other devices at other locations, the same location, or even other components within the same system. For example, the communication unit 208 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 208 may permit data to be exchanged with a network and/or any other devices or systems described in the present disclosure.

The display 210 may be configured as one or more displays, like an LCD, LED, or other type display. The display 210 may be configured to present video, text captions, user interfaces, and other data as directed by the processor 202.

The user interface unit 212 may include any device to allow a user to interface with the system 200. For example, the user interface unit 212 may include a mouse, a track pad, a keyboard, a touchscreen, and/or a piezoelectric transducer, among other devices. The user interface unit 212 may receive input from a user and provide the input to the processor 202.

The peripheral devices 214 may include one or more devices. For example, the peripheral devices may include a microphone, an imager, and/or a speaker, among potentially other peripheral devices. In these and other embodiments, the microphone may be configured to capture audio. The imager may be configured to capture digital images. The digital images may be captured in a manner to produce video or image data. In some embodiments, the speaker may broadcast audio received by the system 200 or otherwise generated by the system 200.

Modifications, additions, or omissions may be made to the system 200 without departing from the scope of the present disclosure.

Figure 3:
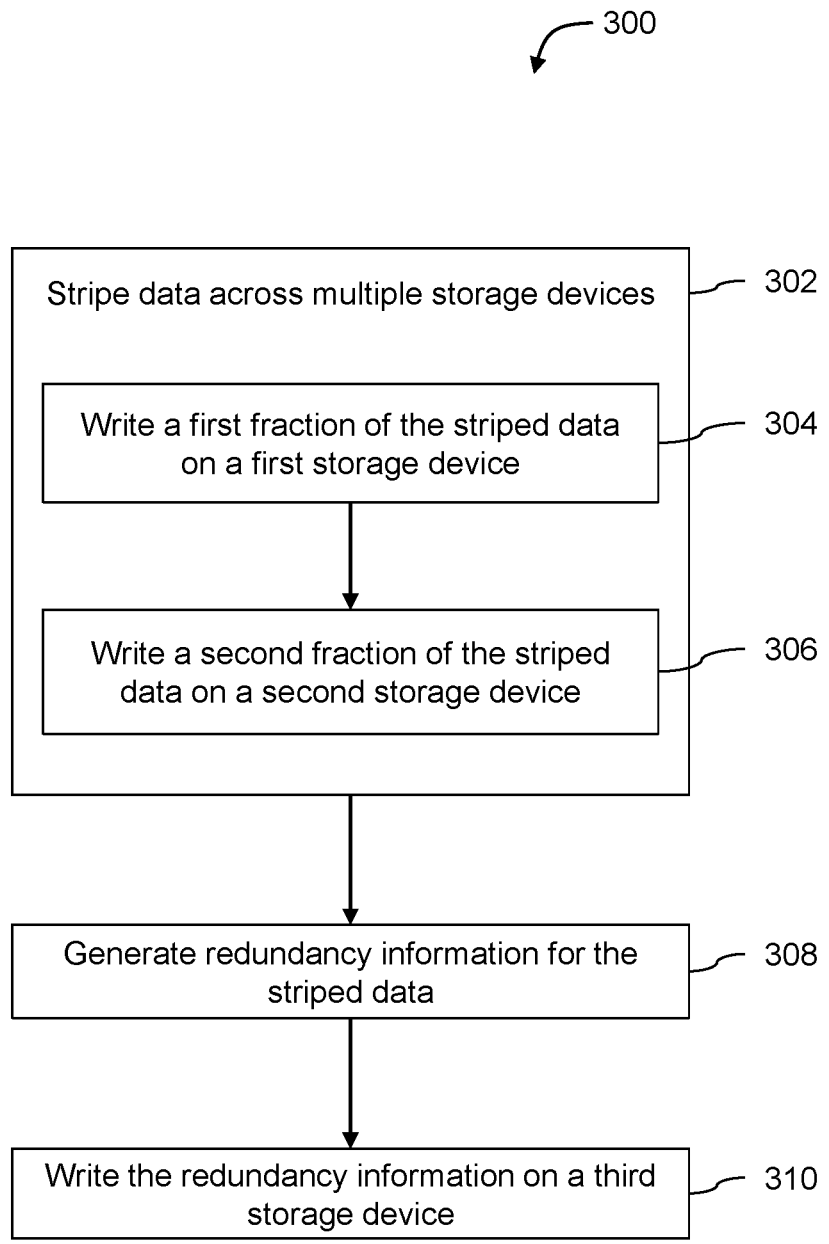
FIG. 3 is a flowchart of an example method to store data with redundancy protection, all arranged in accordance with at least one embodiment described herein.

FIG. 3 is a flowchart of an example computer-implemented method to store data, arranged in accordance with at least one embodiment described herein. The method 300 may be performed, in whole or in part, in some embodiments by a system such as the system 100 and/or the system 200 of FIGS. 1 and 2, respectively. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where data may be striped across multiple storage devices. Striping the data across multiple storage devices may include striping the data across multiple physical storage devices or cloud-based storage locations. Alternatively or additionally, striping the data across multiple storage devices may include writing a first fraction of the data on a first storage device at block 304 and writing a second fraction of the data on a second storage device at block 306. Alternatively or additionally, the multiple storage devices may include three or more storage devices in which case different fractions of the data may be written to different ones of the storage devices. Block 302 may be followed by block 308.

In block 308, redundancy information for the data may be generated. In some embodiments, the redundancy information may include one or more of parity bits, error-correcting codes, or erasure codes. Block 308 may be followed by block 310.

In block 310, the redundancy information may be written on a third storage device. The third storage device may include a remote or removable storage device. In some embodiments, the redundancy information may be written on the third storage device synchronously with striping the data. Alternatively, in some embodiments, the redundancy information may be written on the third storage device asynchronously with striping the data. In some embodiments, the third storage device may be communicatively coupled with the first storage device and the second storage device by a wide area network or by a local area network. In some embodiments, one or more additional layers of redundancy information may be written on one or more additional storage devices.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 300 may further include identifying corrupted data on the first storage device. The method 300 may further include obtaining at least a portion of the redundancy information from the third storage device for the corrupted data. The method 300 may further include repairing the corrupted data on the first storage device using the at least the portion of the redundancy information.

In some embodiments, the method 300 may further include determining an allocation of the redundancy information between the third storage device and a fourth storage device. The fourth storage device may include a remote or removable storage device. The third storage device and the fourth storage device may have different ownership. A first fraction of the redundancy information may be written to the third storage device and a second fraction of the redundancy information may be written to the fourth storage device. The first fraction of the redundancy information and the second fraction of the redundancy information may be based on the allocation of the redundancy information between the third storage device and the fourth storage device. In these and other embodiments, the method 300 may further include identifying a changed condition of the third storage device after writing the first fraction of redundancy information and the second fraction of redundancy information. The method 300 may further include changing the allocation of redundancy information between the third storage device and the fourth storage device in response to the changed condition.

Some embodiments described herein may be implemented in a database. The database may be similar or analogous in some respects to one or more of the local data storage devices 120 of FIG. 1. In particular, data may be stored in the database similar or analogous to storage of data in one or more of the local data storage devices 120 of FIG. 1.

A database transaction may include a unit of work, typically encapsulating a number of operations (e.g., read, write, lock) over the database. When a transaction involves writing data to the database, redundancy information may be generated for the transaction. In some cases, redundancy information may be generated for each transaction in general, or for each transaction that involves writing to the database, or for at least some transactions. The redundancy information may be stored in one or more remote storage devices, such as one or more of the remote data storage devices 140 of FIG. 1 such that redundancy information is generated for and associated with each of one or more transactions.

The redundancy information may be used at virtually any time to check for corruption of the database. For instance, as or after data is read from the database, redundancy information may be retrieved that was generated when the data was written to the database. The data read from the database may be used to generate new redundancy information. The retrieved redundancy information may be compared to the new redundancy information. If the two match, the match may indicate that the transaction in which the data was written to the database completed without being comprised such that the data is not corrupt. If the two match, the analysis may proceed to a next transaction. If the two do not match, the data in the database may be repaired using the redundancy information and any transactions that were dependent on the data may be rolled back and their transactions may be restarted, e.g., in sequence, using the repaired data.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. All of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing system, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device may include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above may be varied—for example, blocks may be re-ordered, combined, and/or broken into sub-blocks. Certain blocks or processes may be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments.

Accordingly, it should be understood that the present disclosure has been presented for-purposes of example rather than limitation, and does not preclude inclusion of such modifications, variations, and/or additions to the present subject matter as would be readily apparent to one of ordinary skill in the art.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, various changes, substitutions, and alterations could be made hereto without departing from the spirit and scope of the invention.

What is claimed is:

1. A computer-implemented method to store data, the method comprising:
   writing data for each of multiple transactions to a database;
   generating redundancy information for each of the multiple transaction;
   writing the redundancy information to a cloud storage;
   reading data associated with a corresponding one of the multiple transactions from the database;
   generating new redundancy information from the read data;
   reading the redundancy information associated with the corresponding one of the multiple transaction from the cloud storage;
   comparing the new redundancy information to the redundancy information; and
   in response to the new redundancy information not matching the redundancy information, determining that the read data from the database is corrupted data.

2. The method of claim 1, wherein writing the data comprises striping the data across multiple local data storage devices arranged in a RAID-0 configuration, including:
   writing a first fraction of the data to a first physical storage device; and
   writing a second fraction of the data to a second physical storage device.

3. The method of claim 1, further comprising repairing the corrupted data in the database-using the redundancy information.

4. The method of claim 1, wherein generating the redundancy information comprises generating one or more of parity bits, error-correcting codes, or erasure codes.

5. The method of claim 1, wherein writing the redundancy information comprises writing the redundancy information asynchronously with writing the data.

6. The method of claim 1, further comprising:
   determining an allocation of the redundancy information between a first cloud storage and a second cloud storage, each of the first cloud storage and the second cloud storage communicatively coupled with the database by a network;
   wherein the writing the redundancy information to the cloud storage comprises, based on the allocation:
      writing a first fraction of the redundancy information to the first cloud storage; and
      writing a second fraction of the redundancy information to the second cloud storage.

7. A computer-implemented method to store data, the method comprising:
   configuring a first physical storage device and a second physical storage device in a RAID-0 array;
   writing data to the RAID-0 array;
   generating redundancy information for the data written to the RAID-0 array;
   determining an allocation of the redundancy information between a first cloud storage and a second cloud storage, each of the first cloud storage and the second cloud storage communicatively coupled with the RAID-0 array by a network, the first cloud storage and the second cloud storage having different ownership;
   based on the determined allocation:
      asynchronously writing a first fraction of the redundancy information to the first cloud storage; and
      asynchronously writing a second fraction of the redundancy information to the second cloud storage.

8. The method of claim 7, further comprising:
   identifying corrupted data in the RAID-0 array;
   obtaining a portion of the redundancy information from the first cloud storage and the second cloud storage that is associated with the corrupted data; and
   repairing the corrupted data in the RAID-0 array using the portion of the redundancy information.

9. The method of claim 7, wherein generating the redundancy information comprises generating redundancy information for a database transaction.

10. The method of claim 7, further comprising:
    identifying a changed condition of the first cloud storage after writing the first fraction of the redundancy information and the second fraction of the redundancy information; and
    in response to the changed condition, changing the allocation of redundancy information between the first cloud storage and the second cloud storage.

11. The method of claim 7, wherein generating the redundancy information comprises generating one or more of parity bits, error-correcting codes, or erasure codes.

12. The method of claim 7, further comprising:
    reading the data from the RAID-0 array;
    generating new redundancy information from the read data;
    reading the redundancy information associated with the data from the first cloud storage and the second cloud storage;
    comparing the new redundancy information to the redundancy information; and
    in response to the new redundancy information not matching the redundancy information, determining that the read data from the RAID-0 array is corrupted data.

* * * * *